(12) United States Patent
Potter et al.

(10) Patent No.: US 8,928,243 B2
(45) Date of Patent: Jan. 6, 2015

(54) LIGHT DRIVING SYSTEM AND METHOD

(75) Inventors: Geoffrey Potter, New Castle, NH (US); Victor Samuel Sinow, Cambridge, MA (US)

(73) Assignee: Texas Instruments Incorporated, Dallas, TX (US)

( * ) Notice: Subject to any disclaimer, the term of this patent is extended or adjusted under 35 U.S.C. 154(b) by 122 days.

(21) Appl. No.: 13/337,689

(22) Filed: Dec. 27, 2011

(65) Prior Publication Data

US 2013/0162169 A1    Jun. 27, 2013

(51) Int. Cl.
*H05B 37/00* (2006.01)

(52) U.S. Cl.
USPC ......... 315/291; 315/294; 315/297; 315/209 R

(58) Field of Classification Search
USPC .................................. 315/291, 294, 297, 312
See application file for complete search history.

(56) References Cited

U.S. PATENT DOCUMENTS

| | | | |
|---|---|---|---|
| 2010/0283391 A1* | 11/2010 | Braunshtein | 315/127 |
| 2012/0032605 A1* | 2/2012 | Peng | 315/219 |
| 2012/0200232 A1* | 8/2012 | Erhardt et al. | 315/219 |

* cited by examiner

*Primary Examiner* — Tung X Le
*Assistant Examiner* — Jonathan Cooper
(74) *Attorney, Agent, or Firm* — William B. Kempler; Frederick J. Telecky, Jr.

(57) ABSTRACT

A light driving system is provided that includes a light dimmer that receives an AC input signal and provides a dimmer output signal that includes a fast rising leading edge, a rectifier that receives the dimmer output signal and provide a rectified dimmer output signal and an AC/DC converter that filters the rectified dimmer output signal to provide a DC input signal that is employed to drive a light. The light driving system also comprises a protection circuit that limits current to the AC/DC converter during the fast rising leading edge of the dimmer output signal.

14 Claims, 3 Drawing Sheets

LIGHT DRIVING SYSTEM AND METHOD

TECHNICAL FIELD

The present invention relates generally to electronics, and specifically to a light driving system and method.

BACKGROUND

Light driving systems have been available for many years and come in many different configurations. Many light systems are driven directly by AC input signals transformed from an AC mains input signal from a power distribution grid to a residential or commercial building. However, some lighting systems (e.g., Light Emitting Diodes (LEDs)) are driven by a DC input signal, so the AC input signal needs to be converted to a DC input signal. The DC input signal can be provided by rectifying an AC input signal and providing the rectified AC input signal to an AC/DC converter, for example, such as a switching regulator. Between the power distribution grid and the switching regulator in a modern electronic system are many elements, including a power transformer outside of the building, a wire connecting the AC input signal to the electronic system, the circuit breaker or fuse, lightning arrestors, an EMI filter and possibly many other elements. These elements are predominantly reactive, with inductive and capacitive components. The input impedance of a switching regulator can be purely resistive, reactive or even exhibit negative resistance. The series connection of these elements and the regulator can cause resonance which can result in voltage and current ringing by one or more input components, such as the EMI filter. In the most benign cases, this ringing results in extra EMI and power loss. But in more extreme cases, this ringing can result in false operation of the switching regulator.

In lighting systems, another element can be added between the mains and the load known as a light dimmer, which adjusts the brightness of the light. Light dimmers are abundant and set thresholds in which to begin conduction of the AC input signal to a light. This element contains reactive elements but also a semiconductor switch, such as a TRIAC or MOSFET. The discontinuity of the semiconductor switch adds another aspect to the problem. That is light dimmers were designed to drive incandescent lights, which draw current all of the time. However, a switching regulator does not draw current all of the time. This results in transient effects due to fast turn on voltage at the output of the dimmer, which causes ringing of the input stage components (e.g., EMI filter, input capacitors). Ringing of input stage components can cause commutation of the dimmer solid state switch, thus defeating the dimming function and confusing the controller that is attempting to monitor the output behavior of the dimmer.

SUMMARY

In accordance with one aspect of the invention, a light driving system is provided. The light driving system comprises a light dimmer that receives an AC input signal and provides a dimmer output signal that includes a fast rising leading edge, a rectifier that receives the dimmer output signal and provide a rectified dimmer output signal and an AC/DC converter that filters the rectified dimmer output signal to provide a DC input signal that is employed to drive a light. The light driving system also comprises a protection circuit that limits current to the AC/DC converter during the fast rising leading edge of the dimmer output signal.

In accordance with another aspect of the invention, a light driving system is provided that comprises a light dimmer that receives an AC input signal and provides a dimmer output signal that includes a fast rising leading edge, a rectifier that receives the dimmer output signal and provide a rectified dimmer output signal, and an electromagnetic interference (EMI) filter coupled between the light dimmer and the rectifier to mitigate EMI. The light driving system also comprises a switching converter that filters the rectified dimmer output signal to provide a DC input signal to a controller that controls a light driver to drive a light, and a protection circuit that limits current to the switching converter during the fast rising leading edge of the dimmer output signal.

In accordance with another aspect of the invention, a method for suppressing ringing in a light driving system having an AC/DC converter that drives a light. The method comprises switching in a protection element into the light driving system to provide damping to protect the AC/DC converter during a fast rising leading edge of an input signal, and switching out the protection resistor after the fast rising leading edge of the input signal.

DETAILED DESCRIPTION

A light driving system and method are provided for suppressing ringing and inrush current with a single protection circuit in a light driving system that includes a light dimmer coupled to an AC/DC converter that drives a light. This protection circuit allows damping of input resonance (particularly filter related) ringing, while adding no extra cost over the cost of an inrush limiting circuit. The system and method allow for proper management of light dimmers without careful design and construction of the reactive input components. The end result is a lighting system that is more robust for the same, if not lower, cost than current light driving systems.

Figure 1:
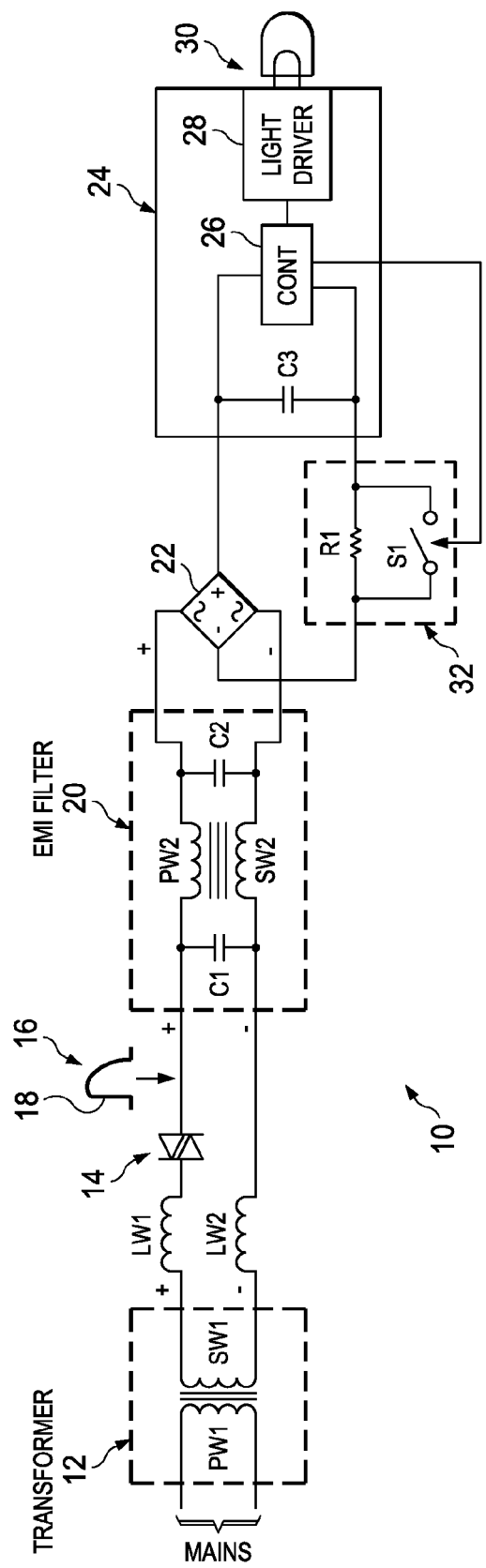
FIG. 1 illustrates a schematic block diagram of a light driving system in accordance with an aspect of the present invention.

FIG. 1 illustrates a light driving system 10 in accordance with an aspect of the present invention. The light driving system 10 includes a transformer 12 that receives an AC mains input signal (e.g., 240 volts or 480 volts) at a primary winding (PW1) and provides an AC input signal (e.g., 115 volts) at a secondary winding (SW1). A positive output terminal of the secondary winding (SW1) is connected to an input of a light dimmer 14 through a first long wire (LW1) and an output of the light dimmer 14 is connected to a positive input terminal of an EMI filter 20. A negative output terminal of the secondary winding (SW1) of the transformer 12 is connected to a negative input terminal of the EMI filter 20 through a second long wire (LW2). The light dimmer 14 sets a threshold value to begin conducting of the AC input signal that is above a zero crossing point of the AC input signal. As a result, the light dimmer 14 provides a dimmer output signal 16 that has a fast rising edge 18 to the EMI filter 20. The EMI filter removes EMI from the dimmer output signal 16 and is formed of a first capacitor (C1), a second capacitor (C2), a primary winding (PW2) and a secondary winding (SW2). However, the fast rising edge 18 of the dimmer output signal 16 can cause ringing of the input stage components (e.g., EMI filter, capacitor C3), which can cause commutation of the light dimmer 14.

A positive output terminal of the EMI filter 20 and a negative output terminal of the EMI filter are provided to a rectifier 22 that rectifies the dimmer output signal and provides the rectified dimmer output signal to a filter formed from a capacitor C3 of an AC/DC converter 24. The capacitor C3 can provide additional EMI filtering for the AC/DC converter 24. However, the capacitor C3 and EMI filter can interact to cause ringing in response to the fast rising leading edge 18 of the dimmer output signal 16, which can cause the rectifier 22 to get reversed biased during the resonant ringing stopping the current flow and forcing the TRIAC of the light dimmer 24 to turn off. It is to be appreciated that other fast rising leading edge signals caused by other components and/or input signals can cause ringing in the in the light driver system and that the dimmer output signal 16 is just one example.

The controller 26 controls a light driver 28 that drives a load in the form of a light 30 (e.g., LED). For example, the AC/DC converter 24 can be a switching regulator, such that the controller 26 controls the turning on and off of one or more field effect transistors (FETs) that form a part of the light driver 28 to generate a regulated DC voltage and/or DC current to drive the load 30 (light).

A protection circuit 32 is placed between a negative output terminal of the rectifier 22 and the controller 26. The protection circuit 32 includes a protection element in the form of a protection resistor R1 coupled in parallel with a switch S1 (e.g., metal oxide field effect transistor (MOSFET). It is to be appreciated that other protection elements having resistive characteristics could be employed in place or in addition to protection resistor R1. The switch S1 is controlled by the controller 26 and is opened (turned off if employing a MOSFET) to provide a protection state in which the protection resistor R1 is coupled between the negative terminal of the rectifier 22 and the controller 26 to provide inrush limiting or ringing suppression. Once the inrush limiting or ringing suppression is completed, the controller 26 can close (turning on if employing a MOSFET) the switch S1 to provide a normal state in which the protection resistor R1 is bypassed or shorted. The protection circuit 32 addresses the problem of inrush current and also the problem of resonance with one circuit. It is to be appreciated that when the switch S1 is open, the AC/DC converter 24 can operate normally, but the series protection resistor R1 acts like a damping element in the system input circuit, reducing Q and reducing ringing. The series resistance can also act like a current limiter, preventing high inrush current.

Figure 2:
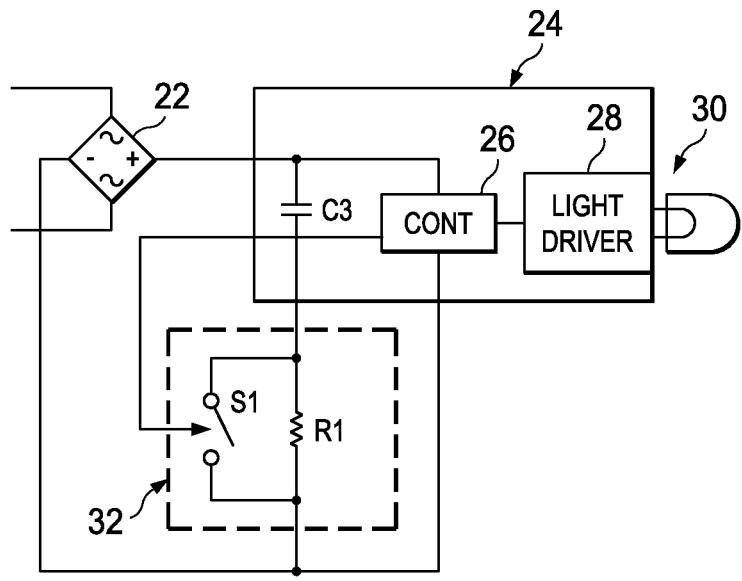
FIG. 2 illustrates a schematic block diagram of a portion of the light driving system of FIG. 1 with the protection circuit placed in another location in accordance with an aspect of the present invention.
Figure 3:
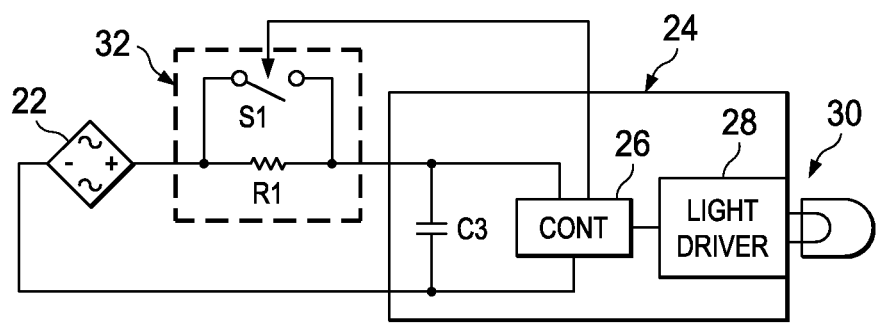
FIG. 3 illustrates a schematic block diagram of a portion of the light driving system of FIG. 1 with the protection circuit placed in yet another location in accordance with an aspect of the present invention.

It is to be appreciated that the protection circuit 32 can be placed in a variety of different locations in series with components of the light driving system 10. For example, as illustrated in FIG. 2, the protection circuit 32 is located such that the protection element (resistor R1) is placed in series with capacitor C3 when switch S1 is open by the controller 26 to provide for damping of the fast rising leading edge of the dimmer output signal, which in turn mitigates ringing. The protection element is bypassed when the switch S1 is closed by the controller 26. FIG. 3 illustrates locating of the protection circuit between the rectifier and the controller. The switch S1 is controlled by the controller 26 and is opened to provide a protection state in which the protection resistor R1 is coupled between the positive terminal of the rectifier 22 and the controller 26 to provide inrush limiting or ringing suppression. Once the inrush limiting or ringing suppression is completed, the controller 26 can close the switch S1 to provide a normal state in which the protection resistor R1 is bypassed or shorted. It is to be appreciated that the protection device can be located in other locations to provide ring suppression and/or inrush limiting.

For inrush limiting, the controller 26 senses a large increase in voltage to the controller 26 at startup and the switch S1 is opened to couple in the protection resistor R1, for example, when the voltage to the controller 26 exceeds a predetermined turn on threshold. The controller 26 then closes the switch S1 to bypass the protection resistor R1 for normal operation once the controller senses that the voltage to the controller has reached a predetermined threshold voltage. For example, usually inside an AC/DC converter, there is a large energy storage capacitor used in the AC/DC conversion process. This capacitor is the one subject to large inrush currents when the converter first turns on, because it is completely discharged. During normal operation, the voltage across this capacitor is such that inrush is no longer a concern For damping, however, timing of the switch drive is more critical. The light dimmer 14 sets a threshold level to begin conduction of the AC input signal, which is above the zero crossing point. As illustrated in FIG. 1, the dimmer output signal 16 has a very fast rising edge 18 due to the fact that the light dimmer begins conducting as soon as the AC input signal reaches the set threshold level. This repeats every cycle of the AC input signal. The fast rising leading edge turn on voltage at the output of the light dimmer 14 results in transient effects, which causes ringing of the input stage components (e.g., EMI filter, C3). Ringing of input stage components can cause commutation of the light dimmer 14, thus defeating the dimming function and confusing the controller 26 that is attempting to monitor the output behavior of the light dimmer 14.

Therefore, the controller 26 opens the switch S1 at each falling edge zero crossing of the dimmer output signal. Upon the controller 26 detecting a leading edge 18 of the dimmer output signal 16 during a dimmer conduction period (TRIAC turns ON), the controller 26 waits a predetermined amount of time that allows sufficient energy to dissipate to suppress ringing and then closes the switch S1 to bypass the resistor R1 for the remaining amount of time in the dimmer conduction period. The predetermined time period can be selected to limit excessive power dissipation and allow the system 10 to operate normally. In one aspect of the invention, the switch S1 is a MOSFET and the controller slowly turns on the MOSFET upon detection of the leading edge 18 of the dimmer output signal 16. In either case, the controller 26 then detects the next zero crossing and opens the switch S1 and repeats the process for the next cycle.

In view of the foregoing structural and functional features described above, certain methods will be better appreciated with reference to FIG. 2. It is to be understood and appreciated that the illustrated actions, in other embodiments, may occur in different orders and/or concurrently with other actions. Moreover, not all illustrated features may be required to implement a method.

Figure 4:
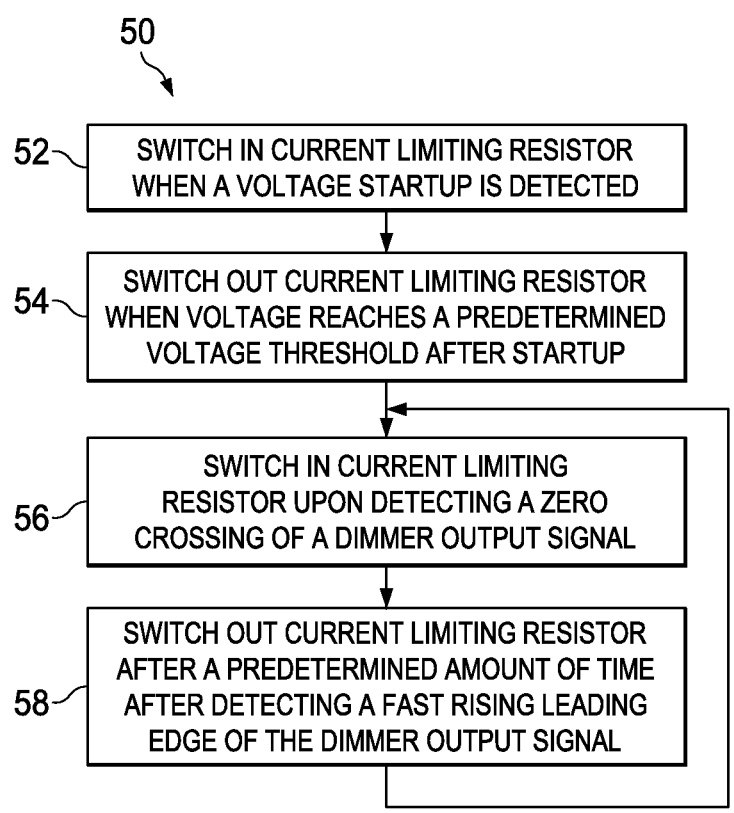
FIG. 4 illustrates a method for suppressing ringing in a light driving system in accordance with an aspect of the invention.

FIG. 4 illustrates a method 50 for suppressing ringing in a light driving system having a light dimmer coupled to an AC/DC converter that drives a light in accordance with an aspect of the present invention. The method 50 begins at 52. At 52, a protection resistor is switched into the light driving system during startup to protect the AC/DC converter from large current spikes at startup. At 54, the protection resistor can be switched out of the light driving system after the voltage input to the AC/DC converter has reached a predetermined voltage threshold. The methodology then proceeds to 56. At 56, the protection resistor is switched into the light driving system to act as a damper and protect the AC/DC converter during a fast rising leading edge of a dimmer output signal. The protection resistor can be switched at a falling edge zero crossing point of a conduction cycle of the dimmer output signal. The protection resistor can be coupled in parallel with a switch, which are both serially coupled between a rectifier that receives the dimmer output signal and the AC/DC converter that receives a rectified dimmer output signal from the rectifier. At 58, the protection resistor is switched out of the light driving system after a predetermined amount of time after detecting a fast rising leading edge of the dimmer output signal to allow sufficient energy dissipation to mitigate ringing caused by the fast rising leading edge of the dimmer output signal. The methodology then repeats 56 and 58 for subsequent conduction cycles of the dimmer output signal.

What have been described above are examples of the invention. It is, of course, not possible to describe every conceivable combination of components or method for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A light driving system comprising:
   a light dimmer that receives an AC input signal and provides a dimmer output signal that includes a fast rising leading edge;
   a rectifier that receives the dimmer output signal and provide a rectified dimmer output signal;
   an AC/DC converter that filters the rectified dimmer output signal to provide a DC input signal that is employed to drive a light; and
   a protection circuit that limits current to the AC/DC converter during the fast rising leading edge of the dimmer output signal, wherein a controller opens the switch at a falling edge zero crossing point of the dimmer output signal, monitors for the fast rising leading edge of the dimmer output signal and closes the switch bypassing the protection element after a predetermined amount of time after the fast rising leading edge of the dimmer output signal is detected to allow sufficient energy dissipation to mitigate ringing caused by the fast rising leading edge.

2. The system of claim 1, wherein the protection circuit also limits inrush current at startup of the light driving system.

3. The system of claim 1, wherein the protection circuit is a protection element coupled in parallel with a switch, wherein the protection element is coupled into the light driving system during the fast rising leading edge of the dimmer output signal by opening the switch and bypassed after the fast rising leading edge of the dimmer output signal by closing of the switch.

4. The system of claim 1, wherein the controller is part of the AC/DC regulator and drives a driver circuit to provide a DC voltage to turn on the light and the filter is an input capacitor of the controller.

5. The system of claim 1, wherein the switch is a metal oxide field effect transistor (MOSFET) and the controller slowly turns on the MOSFET upon detection of a fast rising leading edge of the dimmer output signal.

6. The system of claim 1, wherein the protection element and switch are coupled between the rectifier and the controller.

7. The system of claim 1, wherein the protection element and switch are coupled in series with an input capacitor of the controller.

8. A light driving system comprising:
   a light dimmer that receives an AC input signal and provides a dimmer output signal that includes a fast rising leading edge;
   a rectifier that receives the dimmer output signal and provide a rectified dimmer output signal;
   an electromagnetic interference (EMI) filter coupled between the light dimmer and the rectifier to mitigate EMI;
   a switching converter that filters the rectified dimmer output signal to provide a DC input signal to a controller that controls a light driver to drive a light; and
   a protection circuit that limits current to the switching converter during the fast rising leading edge of the dimmer output signal, wherein the controller opens the switch at a falling edge zero crossing point of the dimmer output signal, monitors for the fast rising leading edge of the dimmer output signal and closes the switch bypassing the resistor after a predetermined amount of time after the fast rising leading edge of the dimmer output signal has been detected to allow sufficient energy dissipation to mitigate ringing caused by the fast rising leading edge.

9. The system of claim 8, wherein the protection circuit is a protection resistor coupled in parallel with a switch, wherein the protection resistor is coupled into the light driving system during the fast rising leading edge of the dimmer output signal by opening the switch and bypassed after the fast rising leading of the dimmer output signal by closing of the switch.

10. The system of claim 8, wherein the protection resistor and switch are coupled between the rectifier and the controller.

11. The system of claim 10, wherein the protection resistor and switch are coupled in series with an input capacitor of the controller.

12. The system of claim 11, wherein the controller couples the protection resistor into the light driving system at startup to limit inrush current.

13. The system of claim 8, wherein the switch is a metal oxide field effect transistor (MOSFET) and the controller slowly turns on the MOSFET upon detection of a fast rising leading edge of the dimmer output signal.

14. A method for suppressing ringing in a light driving system having an AC/DC converter that drives a light, the method comprising:
   switching in a protection element into the light driving system to provide damping to protect the AC/DC converter during a fast rising leading edge of an input signal;
   switching out the protection element after the fast rising leading edge of the input signal;
   switching in the protection element into the light driving system during startup to protect the AC/DC converter from inrush current; and
   switching out the protection element after the voltage to the AC/DC converter has reached a predetermined voltage, wherein the switching in the protection element into the light driving system comprises switching in a protection resistor at a falling edge zero crossing point of a dimmer output signal and the switching out the protection element after the fast rising leading edge comprises switching out the protection resistor after a predetermined amount of time to allow sufficient energy dissipation to mitigate ringing caused by the fast rising leading edge.

* * * * *